United States Patent
Trigui et al.

(10) Patent No.: US 9,829,884 B1
(45) Date of Patent: Nov. 28, 2017

(54) SCALABLE DRIVER ASSISTANCE SYSTEM

(71) Applicant: Dura Operating, LLC, Auburn Hills, MI (US)

(72) Inventors: Nizar Trigui, Leonard, MI (US); Mike Liubakka, Northville, MI (US); Gordon M. Thomas, Beverly Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/151,039

(22) Filed: May 10, 2016

(51) Int. Cl.
  *G05D 1/00* (2006.01)
  *G05D 1/02* (2006.01)
(52) U.S. Cl.
  CPC ......... *G05D 1/0061* (2013.01); *G05D 1/0242* (2013.01); *G05D 1/0246* (2013.01); *G05D 1/0255* (2013.01); *G05D 1/0257* (2013.01)
(58) Field of Classification Search
  CPC .. G05D 1/0061; G05D 1/0264; G05D 1/0255; G05D 1/0257; G05D 1/0242
  See application file for complete search history.

(56) References Cited

U.S. PATENT DOCUMENTS

| | | | |
|---|---|---|---|
| 2006/0129732 A1* | 6/2006 | Tsai | G06F 13/4027 710/305 |
| 2012/0218412 A1 | 8/2012 | Dellantoni et al. | |
| 2014/0160252 A1 | 6/2014 | Randler et al. | |
| 2015/0331422 A1 | 11/2015 | Hartung et al. | |
| 2017/0176989 A1* | 6/2017 | Hay | B60T 7/12 |

* cited by examiner

*Primary Examiner* — Anne M Antonucci
(74) *Attorney, Agent, or Firm* — Robert E. Ford; Steven L. Crane; Raymond J. Vivacqua

(57) ABSTRACT

A scalable driver assistance system for a motor includes a central safety domain controller having a first perception logic circuit communicatively coupled to a first chipset socket and to a second chipset socket, wherein the first chipset socket is communicatively coupled to the second chipset socket and to a third chipset socket. A first long range front camera is communicatively coupled to the first perception logic circuit and a plurality of surround view cameras communicatively are coupled to the first perception logic circuit. The central safety domain controller provides first and second levels of driver assistance, and additional circuits or microcontrollers may be selectively connected into one of the first, second, and third chipset sockets to provide third, fourth, or fifth levels of automated driving assistance.

20 Claims, 6 Drawing Sheets

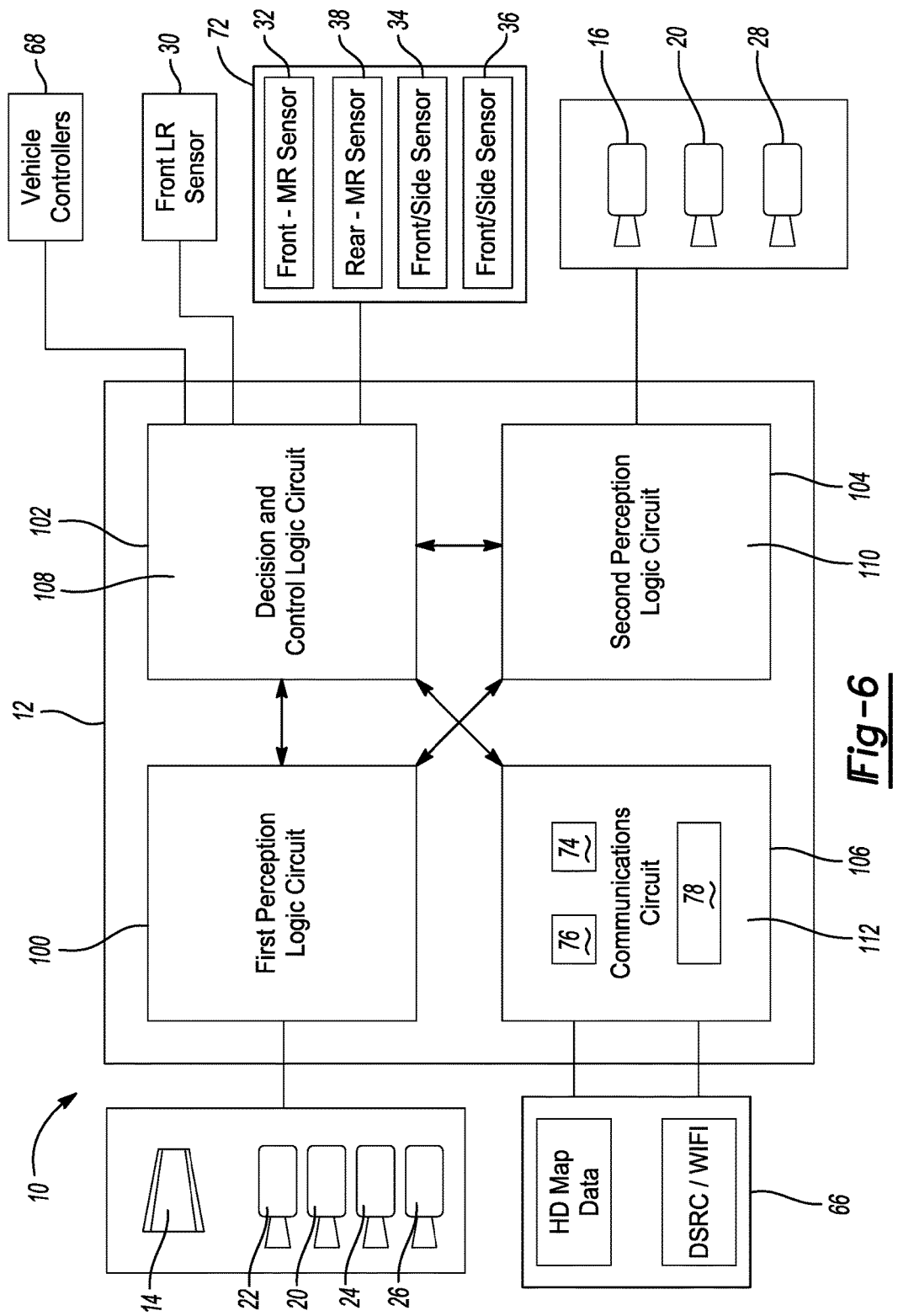

SCALABLE DRIVER ASSISTANCE SYSTEM

FIELD

The invention relates generally to a driver assistance system for a motor vehicle, and more particularly to a driver assistance system having a scalable architecture with a central safety controller and optional first, second, and third integrated circuits for providing different levels of driver assistance.

BACKGROUND

The statements in this section merely provide background information related to the present disclosure and may or may not constitute prior art.

Motor vehicles have been designed with increasingly advanced technologies aimed at improving the safety, efficiency, and performance of the motor vehicle. An example of such technologies include advanced driver assistance systems. Generally, advanced driver assistance systems automate, adapt, or enhance vehicle systems in order to increase vehicle safety and/or operator driving performance. Advanced driver assistance systems may rely on inputs from multiple data sources, including LiDAR, sonar, ultrasound, radar, image processing from cameras, and inputs are possible from other sources separate from the motor vehicle itself such as vehicle-to-vehicle (V2V) or vehicle-to-Infrastructure (V2I) systems. Advanced driver assistance systems are designed to avoid accidents by offering technologies that alert the driver to potential problems or to avoid collisions by implementing safeguards, such as autonomously controlling the vehicle. Operator driving performance may be improved by using features that enhance certain systems, such as automated lighting, automated parking, adaptive cruise control, automated braking, or improved blind spot elimination using camera technology.

Advanced driver assistance systems have been defined into various levels of driver assistance, from low levels with no automation and with a human driver monitoring everything, to high levels with high automation and complete, or nearly complete, computer monitoring. However, each level of driver assistance has an associated complexity with respect to the sensors, cameras, actuators, and processing power required to implement a driver assistance system at that particular level. To achieve higher levels of driver assistance by simply adding additional sensors with associated controllers to communicate with additional vehicle electronic control modules can result in complex systems having increased latency and unpredictable interactions. This field can therefore benefit from a scalable driver assistance system that can readily be tailored to a desired level of driver assistance.

SUMMARY

According to several aspects, a scalable driver assistance system for a motor vehicle includes a central safety domain controller having a first perception logic circuit communicatively coupled to a first chipset socket and to a second chipset socket, wherein the first chipset socket is communicatively coupled to the second chipset socket and to a third chipset socket. A first long range front camera is communicatively coupled to the first perception logic circuit and a plurality of surround view cameras are communicatively coupled to the first perception logic circuit. The central safety domain controller provides first and second levels of driver assistance, and additional circuits or microcontrollers may be selectively connected into one of the first, second, and third chipset sockets to provide third, fourth, or fifth levels of automated driving assistance.

In one aspect, the scalable driver assistance system includes a decision and control logic microcontroller connected into the first chipset socket.

In another aspect, the scalable driver assistance system includes a front long range radar communicatively coupled to the decision and control logic microcontroller.

In another aspect, the decision and control logic microcontroller is communicatively coupled to a vehicle braking controller, a vehicle steering controller, or a vehicle powertrain controller.

In another aspect, the scalable driver assistance system includes a second perception logic integrated circuit connected into the second chipset socket.

In another aspect, the second perception logic integrated circuit has less processing power than the first perception logic integrated circuit.

In another aspect, the scalable driver assistance system includes a front medium range camera, a rear medium range camera, and a driver monitor camera each communicatively coupled to the second perception logic integrated circuit.

In another aspect, the scalable driver assistance system includes a ranging system communicatively coupled to the decision and control logic circuit.

In another aspect, the ranging system includes a front medium range radar, a left medium range radar, and at least one ultrasonic system each communicatively coupled to the decision and control logic microcontroller.

In another aspect, the scalable driver assistance system includes a communications integrated circuit connected into the third chipset socket.

In another aspect, the communications integrated circuit includes a global navigation satellite system receiver and a map memory system, and the communications integrated circuit receives high definition map data.

In another aspect, the communications integrated circuit includes a vehicle communications processor configured to provide vehicle-to-vehicle communications with another vehicle.

In another aspect, the decision and control logic integrated circuit includes a first control logic for receiving information from the first perception logic integrated circuit, the second perception logic integrated circuit, the long range radar, and the ranging system. The decision and control logic integrated circuit also includes a second control logic for performing a rationality test by comparing the information received from the first perception logic integrated circuit, the second perception logic integrated circuit, the long range radar, and the ranging system. The decision and control logic integrated circuit further includes a third control logic for placing the central safety domain controller in a reduced capability mode in the event that the rationality test indicates a conflict between the information received from any one of the first perception logic integrated circuit, the second perception logic integrated circuit, the long range radar, and the ranging system and information received from any other one of the first perception logic integrated circuit, the second perception logic integrated circuit, the long range radar, and the ranging system.

In another aspect the reduced capability mode includes a fourth control logic for notifying an operator of the motor vehicle to intervene in controlling the motor vehicle.

In another aspect, the reduced capability mode includes controlling the vehicle autonomously at a lower level of driving automation.

In another aspect, the decision and control logic integrated circuit includes a fifth control logic for commanding the vehicle braking controller, the vehicle steering controller, or the vehicle powertrain controller based on information received from the first perception logic integrated circuit.

In another aspect, the information received from the first perception logic integrated circuit is information about the state of a traffic signal, a traffic sign, a speed limit sign, lane markings, an obstacle, or a parking space.

According to further aspects, a scalable driver assistance system for a motor vehicle includes a domain controller. The domain controller includes a decision and control logic microcontroller, a first perception logic integrated circuit communicatively coupled to the decision and control logic microcontroller, and a second perception logic integrated circuit communicatively coupled to the decision and control logic microcontroller and to the first perception logic integrated circuit. A ranging device is communicatively coupled to the decision and control logic microcontroller. A first set of cameras is communicatively coupled to the first perception logic integrated circuit; and a second set of cameras is communicatively coupled to the second perception logic integrated circuit. The domain controller provides a third level of driver assistance, and removing one or both of the second perception logic integrated circuit and the decision and logic microcontroller provides first and second levels of driver assistance. The domain controller is functional to control the vehicle using the second perception logic integrated circuit and the second set of cameras if the first perception logic integrated circuit or the first set of cameras enters a fault condition.

In another aspect a communications integrated circuit is communicatively coupled to the decision and control logic microcontroller. The communications integrated circuit has a global navigation satellite system receiver and a map memory system for providing a fourth level of driver assistance. The communications integrated circuit also has a vehicle communications processor configured to provide vehicle-to-vehicle communications with another vehicle to provide a fifth level of driver assistance.

According to further aspects, a scalable driver assistance system for a motor vehicle includes a domain controller. The domain controller includes a decision and control logic microcontroller, a first perception logic integrated circuit communicatively coupled to the decision and control logic microcontroller, and a second perception logic integrated circuit communicatively coupled to the decision and control logic microcontroller and to the first perception logic integrated circuit. A front long range radar is communicatively coupled to the decision and control logic microcontroller. A first long range front camera and a plurality of surround view cameras are communicatively coupled to the first perception logic circuit. A front medium range camera, a rear medium range camera, and a driver monitor system are communicatively coupled to the second perception logic integrated circuit. The domain controller provides a third level of driver assistance, and removing one or both of the second perception logic integrated circuit and the decision and logic microcontroller provides first and second levels of driver assistance. The domain controller is functional to control the vehicle using the second perception logic integrated circuit and the second set of cameras if the first perception logic integrated circuit or the first set of cameras enters a fault condition.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 6 is schematic view of a third configuration of the scalable advanced driver assistance system architecture.

DETAILED DESCRIPTION OF THE INVENTION

The following description is merely exemplary in nature and is not intended to limit the present disclosure, application, or uses.

Figure 1:
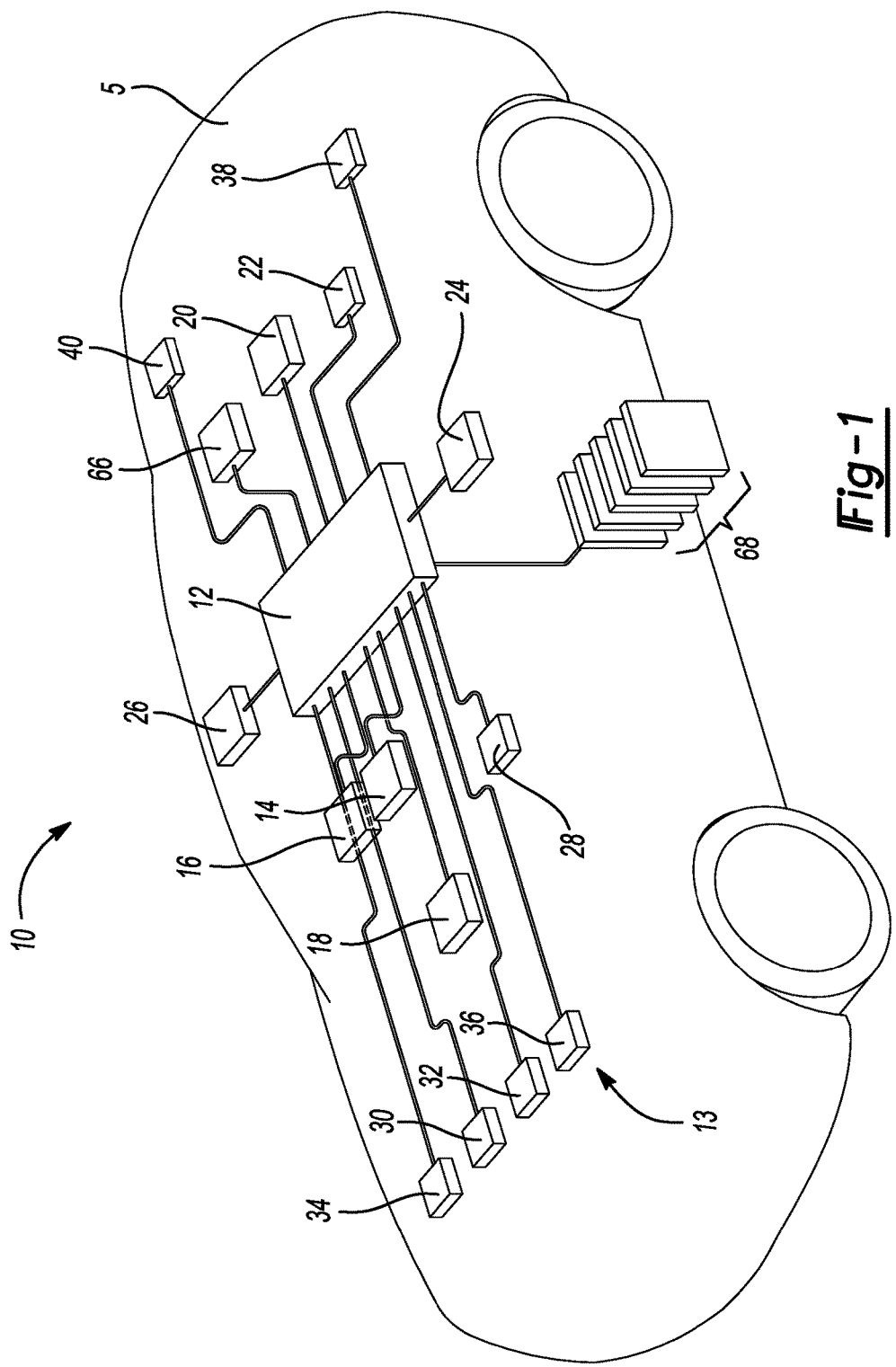
FIG. 1 is schematic view of an exemplary motor vehicle having an advanced driver assistance system.

With reference to FIG. 1, an exemplary motor vehicle 5 is illustrated with a scalable driver assistance system, generally indicated by reference number 10. The motor vehicle 5 is illustrated as a passenger car, however, the motor vehicle 5 may be any type of vehicle, such as a truck, van, sport utility vehicle, etc. The scalable driver assistance system 10 includes a central safety domain controller 12 in electronic communication with, or communicatively coupled to, one or more driver assistance devices 13 mounted to the motor vehicle 5. The driver assistance devices 13 may take various forms and generally include sensors and/or communication devices used in various levels of driving automation. These levels of driving automation are defined by SAE International's standard J3016 titled "Taxonomy and Definitions for Terms Related to On-Road Motor Vehicle Automated Driving Systems", issued January 2014, as summarized in the table below:

| SAE level | Name | Execution of Steering and Acceleration/ Deceleration | Monitoring of Driving Environment | Fallback Performance of Dynamic Driving Task | System Capability (Driving Modes) |
|---|---|---|---|---|---|
| 0 | No Automation | Human driver | Human driver | Human driver | n/a |
| 1 | Driver | Human driver and | Human driver | Human driver | Some driving |

-continued

| SAE level | Name | Execution of Steering and Acceleration/ Deceleration | Monitoring of Driving Environment | Fallback Performance of Dynamic Driving Task | System Capability (Driving Modes) |
|---|---|---|---|---|---|
| | Assistance | system | | | modes |
| 2 | Partial Automation | System | Human driver | Human driver | Some driving modes |
| 3 | Conditional Automation | System | System | Human driver | Some driving modes |
| 4 | High Automation | System | System | System | Some driving modes |
| 5 | Full Automation | System | System | System | All driving modes |

Under SAE International's standard J3016, Level 0 includes the full-time performance by the human driver of all aspects of the dynamic driving task, even when enhanced by warning or intervention systems. Level 1 includes the driving mode-specific execution by a driver assistance system of either steering or acceleration/deceleration using information about the driving environment and with the expectation that the human driver perform all remaining aspects of the dynamic driving task. Level 2 includes the driving mode-specific execution by one or more driver assistance systems of both steering and acceleration/deceleration using information about the driving environment and with the expectation that the human driver perform all remaining aspects of the dynamic driving task. Level 3 includes the driving mode-specific performance by an automated driving system of all aspects of the dynamic driving task with the expectation that the human driver will respond appropriately to a request to intervene. Level 4 includes the driving mode-specific performance by an automated driving system of all aspects of the dynamic driving task, even if a human driver does not respond appropriately to a request to intervene. Level 5 includes the full-time performance by an automated driving system of all aspects of the dynamic driving task under all roadway and environmental conditions that can be managed by a human driver.

The scalable driver assistance system 10 is scalable with respect to the levels of driving automation by scaling the central safety domain controller 12 based on the number and type of driver assistance devices 13 communicatively coupled to the central safety domain controller 12. The number and type of driver assistance devices 13 are, at least in part, defined by the level of driving automation deployed on the motor vehicle 5. Thus, FIG. 1 shows the scalable driver assistance system 10 in a level 5 configuration. In this configuration, the driver assistance devices 13 may include a plurality of vision based sensors including a front long range camera 14, a front mid-range camera 16, a rear mid-range camera 18, a front surround camera 20, a rear surround camera 22, a left side surround camera 24, a right side surround camera 26, and a driver monitor camera 28.

Figure 2:
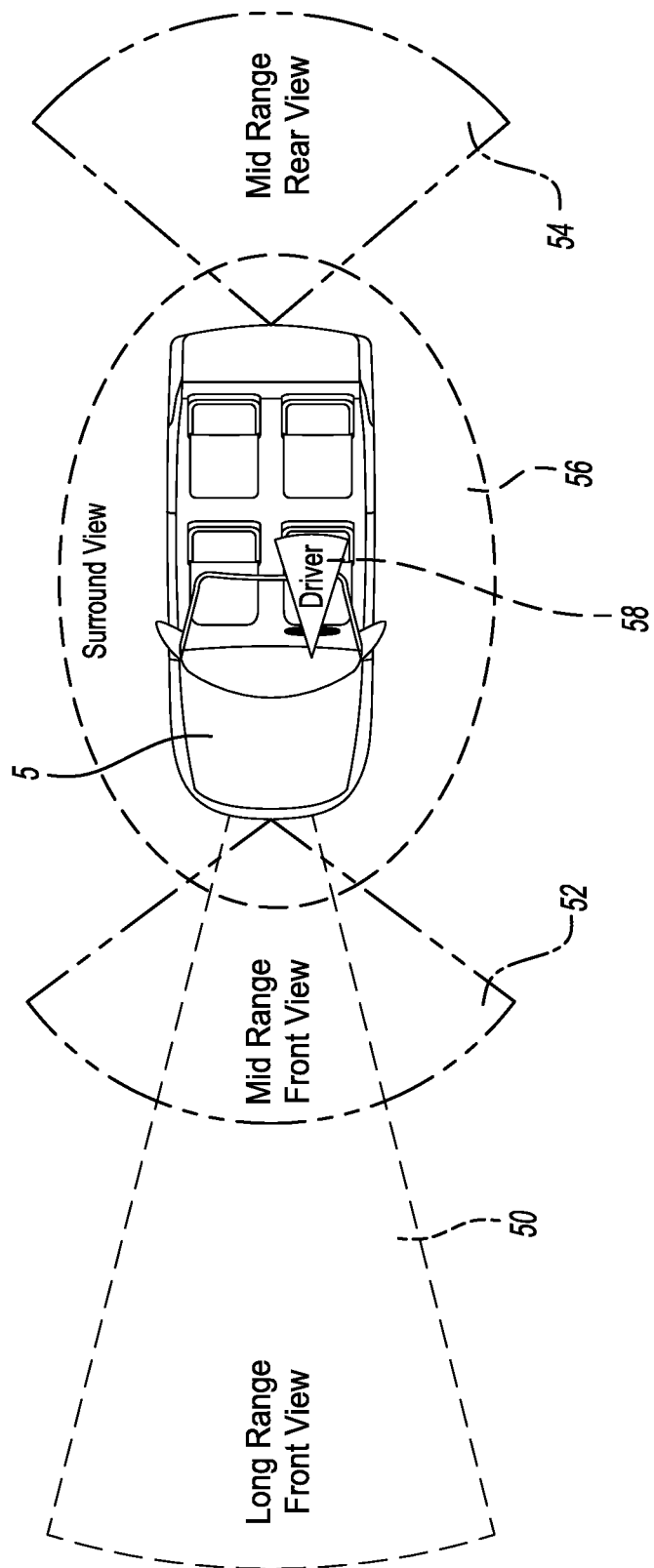
FIG. 2 is a schematic, top view of the exemplary motor vehicle with vision sensor coverage.

Each of the aforementioned cameras 14, 16, 18, 20, 22, 24, 26, and 28 may be configured to capture visual information in the visible light spectrum and/or in a non-visual (e.g. infrared) portion of the light spectrum. FIG. 2 illustrates examples of coverage areas around the motor vehicle 5 of each of the cameras 14, 16, 18, 20, 22, 24, 26, and 28. The long range camera 14 captures visual information at a maximum range with respect to the cameras 16, 18, 20, 22, 24, 26 in an arc forward of the motor vehicle 5. The front long range camera 14 captures visual information from a front long range camera coverage area 50. The front mid-range camera 16 captures visual information at an intermediate range with respect to the cameras 14, 18, 20, 22, 24, 26 in the arc forward of the motor vehicle 5. The front mid-range camera 16 captures visual information from a front mid-range camera coverage area 52. The rear mid-range camera 18 captures visual information at an intermediate range with respect to the cameras 14, 16, 20, 22, 24, 26 in the arc rearward of the motor vehicle 5. The rear mid-range camera 18 captures visual information from a rear mid-range camera coverage area 54. The front, rear, left and right side surround cameras 20, 22, 24, and 26 capture visual information at a minimum range with respect to the cameras 14, 16, 18 in arcs forward, rearward, left of, and right of the motor vehicle 5, respectively. The images from the surround cameras 20, 22, 24, and 26 are compiled in post processing to generate a surround view image, as will be described below. The surround cameras 18, 20, 24, 26 capture visual information from a surround camera coverage area 56. The driver monitor camera 28 is preferably mounted in the cabin of the motor vehicle 5 facing the driver of the motor vehicle 5. The driver monitor camera 28 captures visual information from a driver coverage area 58. The driver monitor camera 28 may be used to determine the alertness of the driver of the motor vehicle 5, etc. The camera configuration depicted in FIGS. 1 and 2 is intended to be exemplary and non-limiting, in that embodiments of the scalable driver assistance system 10 may include more or fewer cameras than depicted without deviating from the present invention.

Figure 3:
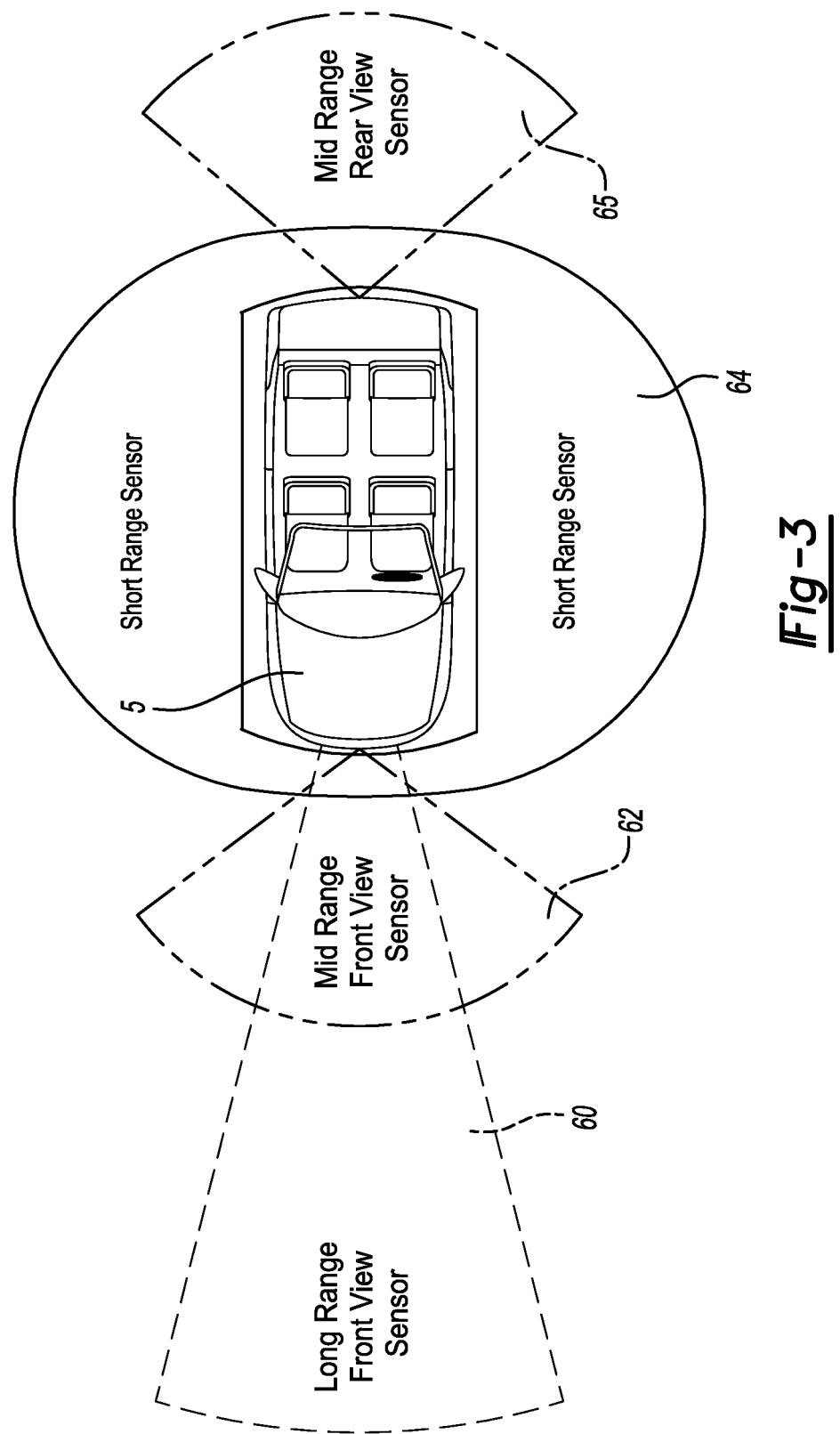
FIG. 3 is a schematic, top view of the exemplary motor vehicle with ranging sensor coverage.

Returning to FIG. 1, the driver assistance devices 13 may also include a plurality of ranging sensors communicatively coupled to the central safety domain controller 12 including a front long range sensor 30, a front mid-range sensor 32, front/side short range sensors 34 and 36, a rear mid-range sensor 38, and a rear short range sensor 40. FIG. 3 illustrates examples of coverage areas around the motor vehicle 5 of each of the ranging sensors 30, 32, 34, 36, 38, and 40. Each of the ranging sensors 30, 32, 34, 36, 38, and 40 may include any ranging technology, including radar, LiDAR, ultrasound, etc., capable of detecting a distance between an object and the motor vehicle 5. The front long range sensor 30 detects objects in an arc in front of the motor vehicle 5 at distances greater than those of sensors 32, 34, 36, 38, and 40. The front long range sensor 30 is configured to detect objects in a long range front view coverage area 60. The front mid-range sensor 32 detects objects in an arc in front of the motor vehicle 5 at distances between those of the front long range sensor 30 and the sensors 34, 36, 38, and 40. The front mid-range sensor 32 is configured to detect objects in a mid-range front view coverage area 62. The front/side short range sensors 34, 36 and rear short range sensor 40 detect objects around the motor vehicle 5 at distances less than those of the sensors 30, 32, and 38. The front/side short range sensors 34, 36 and rear short range sensor 40 are configured to detect objects in short range coverage area 64. The rear mid-range sensor 38 detects objects in an arc rearward of the motor vehicle 5 at distances between those of the front long range sensor 30 and the sensors 34, 36, 40. The rear mid-range sensor 38 is configured to detect objects in a mid-range rear view coverage area 65. Embodiments of the present invention may employ more or fewer ranging sensors than depicted.

Still with reference to FIG. 1, the scalable driver assistance system 10 further includes a communication sensor 66 communicatively coupled to the central safety domain controller 12. The communication sensor 66 generally includes a transceiver for transmitting and/or receiving data wirelessly to and from the motor vehicle 5. The communication sensor 66 may be configured to communicate using Wi-Fi and/or DSRC (Dedicated Short Range Communications) protocol. The communication sensor 66 may be configured to receive global navigation satellite information or to receive and/or transmit high definition (HD) map data stored in memory. Examples of HD map data may include road condition information such as lane closures, construction-related lane shifts, debris in the roadway, stalled vehicle, etc. The communication sensor 66 may include a circuit configured to provide vehicle-to-vehicle (V2V) and vehicle to infrastructure (V2I) communication.

The central safety domain controller 12 is communicatively coupled to one or more vehicle controllers 68. The vehicle controllers 68 may include a vehicle braking controller, a vehicle steering controller, a vehicle powertrain controller, a vehicle engine controller, a vehicle body controller, and/or a vehicle infotainment controller.

Figure 4:
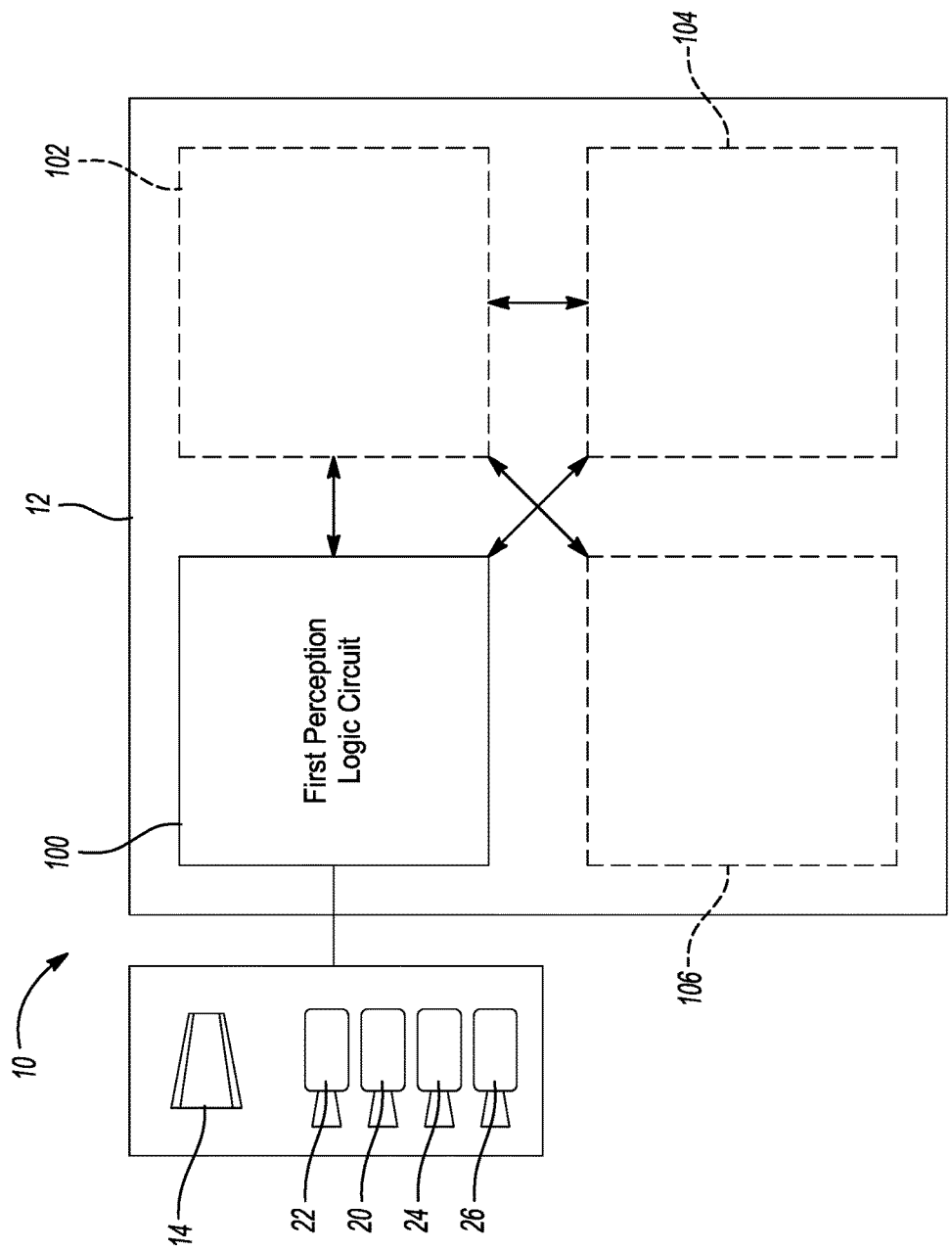
FIG. 4 is schematic view of a first configuration of the scalable advanced driver assistance system architecture.
Figure 5:
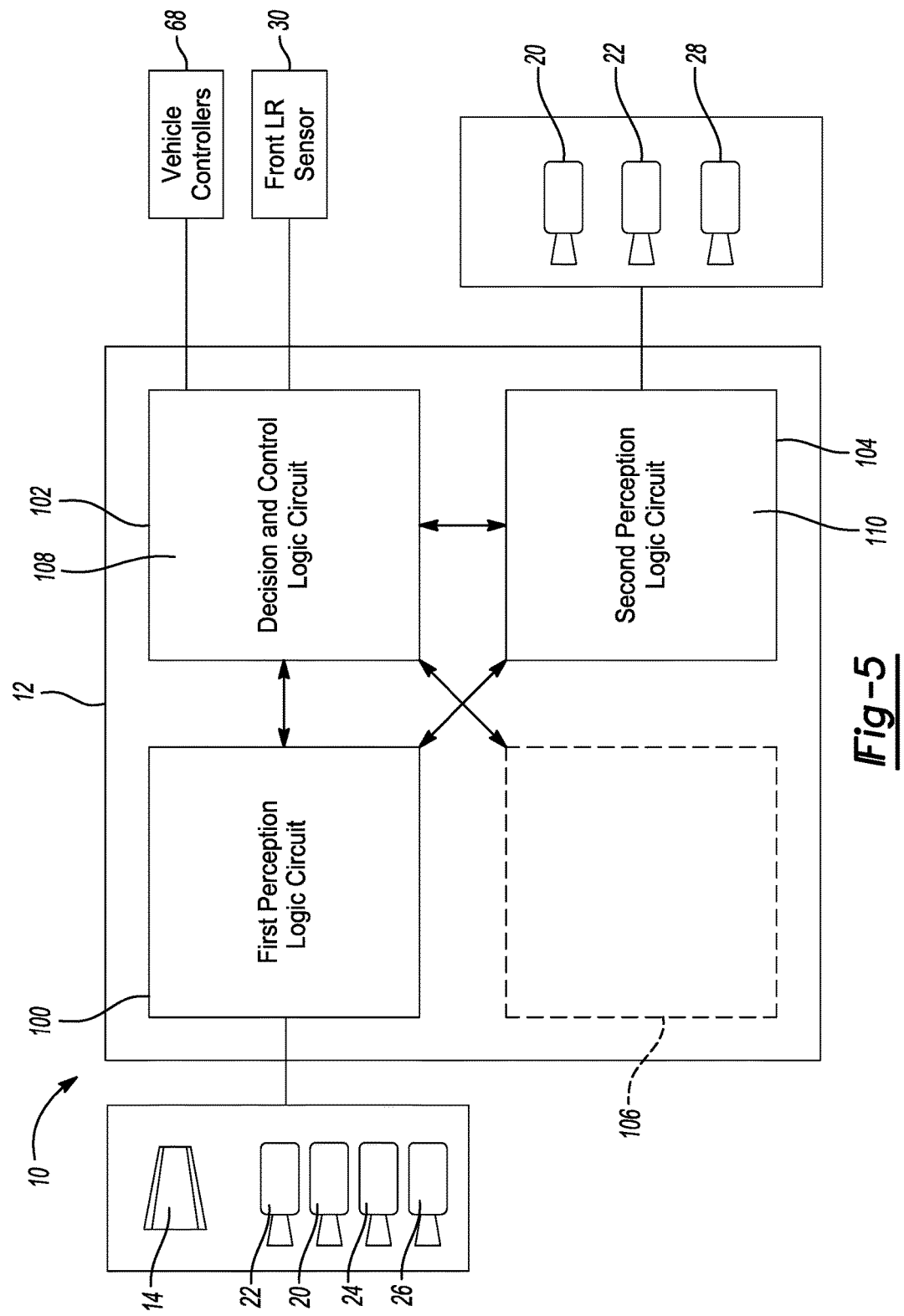
FIG. 5 is schematic view of a second configuration of the scalable advanced driver assistance system architecture.

FIG. 4, the scalable driver assistance system 10 is shown with level 1 autonomous driving capability. The central safety domain controller 12 has a first perception logic integrated circuit 100 communicatively coupled to a first chipset socket 102 and to a second chipset socket 104. The first chipset socket 102 is communicatively coupled to the second chipset socket 104 and to a third chipset socket 106. As used herein, the word "socket" represents a device into which an electronic component can be inserted in order to make a connection in a circuit or alternatively represents a conductor pattern configured to make electrical connections to the electronic component through an intervening conductive attachment means including, but not limited to, solder or conductive adhesive. Devices or chipsets "connected into" a socket represents the state of being inserted into the socket into which the device or chipset can be inserted in order to make a connection in a circuit, or alternatively represents the state of being connected to the conductor pattern through the intervening conductive attachment means. In FIGS. 4-6, communicative coupling between electronic devices and/or sockets within the central safety domain controller 12 is indicated by double-headed arrows.

In order to provide level 1 or level 2 automated driving, the front long range camera 14 and the plurality of surround view cameras 20, 22, 24, 26 are communicatively coupled to the first perception logic integrated circuit 100. Image data from the cameras 14, 20, 22, 24, 26 is communicated to the first perception logic integrated circuit 100. The first perception logic integrated circuit 100 is configured to use the image data from the cameras 14, 20, 22, 24, 26 to perceive the surroundings of the motor vehicle 5, such as lane markings, pedestrians and other objects, etc. The first, second, and third chipset sockets 102, 104, and 106 are empty. In one example, the first perception logic integrated circuit 100 is an automotive vision system-on-chip (SoC) circuit, or integrated circuit, selected from the S32V234 family made by NXP Semiconductor. However, various other SoC circuits may be employed. The system architecture of the scalable driver assistance system 10 is scalable in that additional integrated circuits or microcontrollers may be selectively connected into one or more of the first, second, and third chipset sockets 102, 104, 106 to provide third, fourth, or fifth levels of automated driving.

For example, in FIG. 5 the scalable driver assistance system 10 is illustrated at level 3 automating driving. In this configuration, the central safety domain controller 12 includes a decision and control logic microcontroller 108 connected into the first chipset socket 102 and a second perception logic integrated circuit 110 connected into the second chipset socket 104. The scalable driver assistance system 10 with level 3 automated driving further includes the front long range sensor 30 communicatively coupled to the decision and control logic microcontroller 108. The decision and control logic microcontroller 108 is communicatively coupled to one or more of the vehicle controllers 44, which may include the vehicle braking controller, the vehicle steering controller, and/or the vehicle powertrain controller. The front med-range camera 16, the rear medium range camera 18, and the driver monitor camera 28 are each communicatively coupled to the second perception logic integrated circuit 110.

The second perception logic integrated circuit 110 is configured to use image data from the cameras 16, 20, 28 to perceive the surroundings of the motor vehicle 5, such as lane markings, pedestrians and other objects, etc., either in front or behind the motor vehicle 5, or to perceive the driver of the motor vehicle 5. The second perception logic integrated circuit 110 may be an automotive vision system-on-chip (SoC) circuit selected from the S32V234 family made by NXP Semiconductor. In one embodiment, the second perception logic integrated circuit 110 has less processing power than the first perception logic integrated circuit 100 due to the fewer driver assistance devices 13 connected to the second perception logic integrated circuit 110. For example, the first perception logic integrated circuit 100 may be an S32V234C SoC circuit and the second perception logic integrated circuit 110 may be an S32V234K SoC circuit, both produced by NXP Semiconductor. The decision and control logic microcontroller 108 is configured to receive perception data from the first and second perception logic circuits 100, 110 and to output control commands or decisions based on the perception data. The decision and control logic microcontroller 108 may be a microcontroller unit (MCU) circuit selected from the MPC574xP family made by NXP Semiconductor.

Turning to FIG. 6, the scalable driver assistance system 10 is illustrated at level 4 or 5 automating driving. In this configuration, the central safety domain controller 12 includes a ranging system 72 communicatively coupled to the decision and control logic circuit 108. The ranging system 72 includes the front med-range sensor 32, the rear mid-range sensor 38, and front/side short range sensors 34, 36. A communications integrated circuit 112 is connected into the third chipset socket 106. The communications integrated circuit 112 includes a global navigation satellite system receiver 74 and/or a map memory system 76 that receives high definition map data and GPS controller 78. The communications integrated circuit 112 is communicatively coupled to the communication sensor 66, which is configured to provide vehicle-to-vehicle communications with another vehicle or with infrastructure located in proximity to the motor vehicle 5.

In an embodiment of the present invention, the decision and control logic microcontroller 108 includes a first control logic for receiving information from the first perception logic integrated circuit 100, the second perception logic integrated circuit 110, the front long range sensor 30, and the ranging system 72. The decision and control logic microcontroller 108 further includes a second control logic for performing a rationality test by comparing the information received from the first perception logic integrated circuit 100, the second perception logic integrated circuit 110, the front long range sensor 30, and the ranging system 72. Additionally, the decision and control logic microcontroller 108 includes a third control logic for placing the central safety domain controller 12 in a reduced capability mode in the event that the rationality test indicates a conflict between the information received from any one of the first perception logic integrated circuit 100, the second perception logic integrated circuit 110, the front long range sensor 30, and the ranging system 72 and information received from any other one of the first perception logic integrated circuit 100, the second perception logic integrated circuit 110, the front long range sensor 30, and the ranging system 72. The reduced capability mode may include a fourth control logic for notifying an operator of the motor vehicle to intervene in controlling the motor vehicle 5. Alternatively, the reduced capability mode may include controlling the motor vehicle 5 autonomously at a lower level as defined in SAE standard J3016 or at the same level but with a reduced subset of driving modes at that numeric level, either for an indefinite period of time or until determining based on information from the driver monitor camera 28 that the operator is prepared to assume control of the motor vehicle 5.

The decision and control logic circuit 108 may include a fifth control logic for commanding the vehicle controllers 68 based on information received from the first perception logic integrated circuit 100. The information received from the first perception logic integrated circuit 100 is information about the state of a traffic signal, a traffic sign, a speed limit sign, lane markings, an obstacle, or a parking space.

As used herein, the term "control logic" as applied to, for example, the first control logic, the second control logic, the third control logic, the fourth control logic, and the fifth control logic, means any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The central safety domain controller 12 has a set of control algorithms, including resident software program instructions and calibrations stored in memory and executed to provide the desired functions. The algorithms may be executed at regular time intervals during ongoing vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The following is claimed:

1. A scalable driver assistance system for a motor vehicle, the scalable driver assistance system comprising:
    a central safety domain controller having a first perception logic integrated circuit communicatively coupled to a first chipset socket and to a second chipset socket, wherein the first chipset socket is communicatively coupled to the second chipset socket and to a third chipset socket;
    a first long range front camera communicatively coupled to the first perception logic circuit; and
    a plurality of surround view cameras communicatively coupled to the first perception logic circuit,
    wherein the central safety domain controller provides Level 1 and Level 2 of driver assistance and additional integrated circuits or microcontrollers may be selectively connected into one of the first, second, and third chipset sockets to provide Level 3, Level 4, or Level 5 of automated driving assistance.

2. The scalable driver assistance system of claim 1 further comprising a decision and control logic microcontroller connected into the first chipset socket.

3. The scalable driver assistance system of claim 2 further comprising a front long range sensor communicatively coupled to the decision and control logic microcontroller.

4. The scalable driver assistance system of claim 3 wherein the decision and control logic microcontroller is communicatively coupled to a vehicle braking controller, a vehicle steering controller, or a vehicle powertrain controller.

5. The scalable driver assistance system of claim 4 further comprising a second perception logic integrated circuit connected into the second chipset socket.

6. The scalable driver assistance system of claim 5 wherein the second perception logic integrated circuit has less processing power than the first perception logic integrated circuit.

7. The scalable driver assistance system of claim 5 further comprising a front medium range camera, a rear medium range camera, and a driver monitor camera each communicatively coupled to the second perception logic integrated circuit.

8. The scalable driver assistance system of claim 7 further comprising a ranging system communicatively coupled to the decision and control logic circuit.

9. The scalable driver assistance system of claim 8 wherein the ranging system includes a front medium range sensor, a left medium range sensor, and surround short range sensors each communicatively coupled to the decision and control logic microcontroller.

10. The scalable driver assistance system of claim 9 further comprising a communications integrated circuit connected into the third chipset socket.

11. The scalable driver assistance system of claim 10 wherein the communications integrated circuit includes a global navigation satellite system receiver and a map memory system, wherein the communications integrated circuit receives high definition map data.

12. The scalable driver assistance system of claim 11 wherein the communications integrated circuit further includes a vehicle communications processor configured to provide vehicle-to-vehicle communications with another vehicle.

13. The scalable driver assistance system of claim 12 wherein the decision and control logic integrated circuit includes a first control logic for receiving information from the first perception logic integrated circuit, the second perception logic integrated circuit, the long range sensor, and the ranging system, a second control logic for performing a rationality test by comparing the information received from the first perception logic integrated circuit, the second perception logic integrated circuit, the long range sensor, and the ranging system, and a third control logic for placing the central safety domain controller in a reduced capability mode in the event that the rationality test indicates a conflict between the information received from any one of the first perception logic integrated circuit, the second perception logic integrated circuit, the long range sensor, and the ranging system and information received from any other one of the first perception logic integrated circuit, the second perception logic integrated circuit, the long range sensor, and the ranging system.

14. The scalable driver assistance system of claim 13 wherein the reduced capability mode includes a fourth control logic for notifying an operator of the motor vehicle to intervene in controlling the motor vehicle.

15. The scalable driver assistance system of claim 14 wherein the reduced capability mode includes controlling the vehicle autonomously at a lower level of driving automation.

16. The scalable driver assistance system of claim 11 wherein the decision and control logic integrated circuit includes a fifth control logic for commanding the vehicle braking controller, the vehicle steering controller, or the vehicle powertrain controller based on information received from the first perception logic integrated circuit.

17. The scalable driver assistance system of claim 16 wherein the information received from the first perception logic integrated circuit is information about the state of a traffic signal, a traffic sign, a speed limit sign, lane markings, an obstacle, or a parking space.

18. A scalable driver assistance system for a motor vehicle, the scalable driver assistance system comprising:
a domain controller including:
a decision and control logic microcontroller;
a first perception logic integrated circuit communicatively coupled to the decision and control logic microcontroller;
a second perception logic integrated circuit communicatively coupled to the decision and control logic microcontroller and to the first perception logic integrated circuit;
a ranging device communicatively coupled to the decision and control logic microcontroller;
a first set of cameras communicatively coupled to the first perception logic integrated circuit; and
a second set of cameras communicatively coupled to the second perception logic integrated circuit,
wherein the domain controller provides Level 3 of driver assistance and wherein removing the functionality of one or both of the second perception logic integrated circuit and the decision and logic microcontroller results in the domain controller being functional to provide Level 1 and Level 2 of driver assistance, and
wherein the domain controller is functional to control the vehicle using the second perception logic integrated circuit and the second set of cameras if at least one of the first perception logic integrated circuit or the first set of cameras enters a fault condition.

19. The scalable driver assistance system of claim 18 further comprising a communications integrated circuit communicatively coupled to the decision and control logic microcontroller and having a global navigation satellite system receiver and a map memory system for providing Level 4 of driver assistance and a vehicle communications processor configured to provide vehicle-to-vehicle communications with another vehicle to provide Level 5 of driver assistance.

20. A scalable driver assistance system for a motor vehicle, the scalable driver assistance system comprising:
a domain controller including:
a decision and control logic microcontroller;
a first perception logic integrated circuit communicatively coupled to the decision and control logic microcontroller;
a second perception logic integrated circuit communicatively coupled to the decision and control logic microcontroller and to the first perception logic integrated circuit;
a front long range sensor communicatively coupled to the decision and control logic microcontroller;
a first long range front camera communicatively coupled to the first perception logic circuit;
a plurality of surround view cameras communicatively coupled to the first perception logic circuit;
a front medium range camera communicatively coupled to the second perception logic integrated circuit;
a rear medium range camera communicatively coupled to the second perception logic integrated circuit; and
a driver monitor system communicatively coupled to the second perception logic integrated circuit,
wherein the domain controller provides Level 3 of driver assistance and wherein removing the functionality of one or both of the second perception logic integrated circuit and the decision and logic microcontroller results in the domain controller being functional to provide Level 1 and Level 2 of driver assistance, and
wherein the domain controller is functional to control the vehicle using the second perception logic integrated circuit and the second set of cameras if at least one of the first perception logic integrated circuit or the first set of cameras enters a fault condition.

* * * * *